(12) United States Patent
Williams et al.

(10) Patent No.: US 11,688,925 B2
(45) Date of Patent: Jun. 27, 2023

(54) MODULE FOR A CELLULAR COMMUNICATIONS MONOPOLE

(71) Applicant: CommScope Technologies LLC, Hickory, NC (US)

(72) Inventors: Richard Williams, Wylie, TX (US); Jignesh Patel, Plano, TX (US); Ulrich Gienger, Fairview, TX (US)

(73) Assignee: CommScope Technologies LLC, Hickory, NC (US)

( * ) Notice: Subject to any disclaimer, the term of this patent is extended or adjusted under 35 U.S.C. 154(b) by 68 days.

(21) Appl. No.: 17/227,054

(22) Filed: Apr. 9, 2021

(65) Prior Publication Data

US 2021/0320393 A1     Oct. 14, 2021

Related U.S. Application Data

(60) Provisional application No. 63/008,097, filed on Apr. 10, 2020.

(51) Int. Cl.
   *H01Q 1/22*     (2006.01)
   *H01Q 1/12*     (2006.01)
   *H04W 88/08*    (2009.01)

(52) U.S. Cl.
   CPC ............ *H01Q 1/22* (2013.01); *H01Q 1/1221* (2013.01); *H04W 88/08* (2013.01)

(58) Field of Classification Search
   CPC ... H04B 1/16; H01Q 1/12; H01Q 1/22; H01Q 1/1221; H04W 88/08
   See application file for complete search history.

(56) References Cited

U.S. PATENT DOCUMENTS

| | | | |
|---|---|---|---|
| 5,950,712 A | 9/1999 | Gates | |
| 5,963,178 A * | 10/1999 | Jones | H01Q 1/1242 343/890 |
| 5,995,063 A | 11/1999 | Somoza | |
| 6,222,503 B1 * | 4/2001 | Gietema | H01Q 1/44 343/890 |
| 6,694,698 B2 | 2/2004 | Ryan | |
| 7,253,786 B1 | 8/2007 | Logozzo | |

(Continued)

FOREIGN PATENT DOCUMENTS

| | | |
|---|---|---|
| CN | 207453609 U | 6/2018 |
| CN | 208310374 U | 1/2019 |

(Continued)

OTHER PUBLICATIONS

International Search Report and Written Opinion in International Application No. PCT/US2021/026546 dated Jul. 28, 2021, 11 pages.

(Continued)

*Primary Examiner* — Blane J Jackson
(74) *Attorney, Agent, or Firm* — Merchant & Gould P.C.

(57) ABSTRACT

A module for a base station monopole has a wall defining an interior space. The wall includes an opening configured to receive electronic equipment and a vent opening in communication with the exterior of the module. A reinforcement member is secured to the wall and is positioned opposite to the opening and adjacent the vent opening. A baffle is supported adjacent the wall where the baffle has an intake opening and an exhaust opening in communication with the vent opening. The intake opening is laterally offset from the exhaust opening.

18 Claims, 13 Drawing Sheets

(56) References Cited

U.S. PATENT DOCUMENTS

| | | | |
|---|---|---|---|
| 8,593,370 B2 | 11/2013 | Caldwell | |
| 9,166,274 B2 | 10/2015 | Bennett | |
| 9,253,556 B1 | 2/2016 | Pounds | |
| 9,287,613 B2 | 3/2016 | Colapietro et al. | |
| 9,433,034 B2 | 8/2016 | Hendrix et al. | |
| D788,062 S | 5/2017 | Norrell | |
| D788,063 S | 5/2017 | Norrell | |
| 9,698,477 B1 * | 7/2017 | Jabara | E04H 12/342 |
| 10,135,130 B1 * | 11/2018 | Bouchard | H01Q 1/245 |
| 10,411,336 B1 | 9/2019 | Schwartz | |
| 10,947,751 B2 | 3/2021 | Lockwood | |
| 10,971,811 B1 | 4/2021 | Schwartz | |
| 11,143,371 B2 * | 10/2021 | Bembridge | F21S 8/088 |
| 2013/0113680 A1 | 5/2013 | Nemeth, III et al. | |
| 2016/0365618 A1 | 12/2016 | Kim et al. | |
| 2017/0214115 A1 * | 7/2017 | Norrell | H01Q 1/1242 |
| 2018/0219278 A1 * | 8/2018 | Wigdahl | H01Q 1/1242 |
| 2018/0254545 A1 | 9/2018 | Hendrix | |
| 2018/0351245 A1 * | 12/2018 | Constance | H01Q 1/245 |
| 2019/0190116 A1 | 6/2019 | Hendrix et al. | |
| 2020/0136236 A1 | 4/2020 | Colapietro | |
| 2020/0350686 A1 | 11/2020 | Nemeth, III | |
| 2020/0378164 A1 | 12/2020 | Williams | |
| 2020/0388902 A1 | 12/2020 | Colapietro | |
| 2020/0388907 A1 | 12/2020 | Colapietro | |

FOREIGN PATENT DOCUMENTS

| | | |
|---|---|---|
| EP | 933878 | 8/1999 |
| EP | 1068651 | 1/2001 |
| EP | 2071910 | 6/2009 |
| EP | 2681847 | 1/2014 |
| EP | 2812948 | 12/2014 |
| EP | 2988424 | 2/2016 |
| EP | 2996451 | 3/2016 |
| EP | 3014964 | 4/2016 |
| EP | 3033805 | 6/2016 |
| EP | 3177124 | 6/2017 |
| EP | 3212358 | 9/2017 |
| EP | 3427558 | 1/2019 |
| EP | 3514983 | 7/2019 |
| EP | 3559380 | 10/2019 |
| EP | 3593541 | 1/2020 |
| EP | 3676530 | 7/2020 |
| EP | 3715562 | 9/2020 |
| EP | 3734753 | 11/2020 |
| EP | 3766127 | 1/2021 |
| WO | 1998/53522 | 11/1998 |
| WO | 2006/94229 | 3/2006 |
| WO | 2009/89730 | 7/2009 |
| WO | 2011/43589 | 4/2011 |
| WO | 2012/022595 | 2/2012 |
| WO | 2014/65721 | 5/2014 |
| WO | 2015/77858 | 6/2015 |
| WO | 2015/138341 | 9/2015 |
| WO | 2017/132551 | 8/2017 |
| WO | 2017/221281 | 12/2017 |
| WO | 2018/22307 | 2/2018 |
| WO | 2018/111480 | 6/2018 |
| WO | 2018/153261 | 8/2018 |
| WO | 2018/205939 | 11/2018 |
| WO | 2019053259 A1 | 3/2019 |
| WO | 2019/61003 | 4/2019 |
| WO | 2020/002020 | 1/2020 |
| WO | 202015101 | 1/2020 |
| WO | 2020152294 | 7/2020 |
| WO | 2020/249218 | 12/2020 |

OTHER PUBLICATIONS

PCT International Preliminary Reporton Patentability in International Application No. PCT/US2021/026546 dated Oct. 20, 2022, 8 pages.

* cited by examiner

MODULE FOR A CELLULAR COMMUNICATIONS MONOPOLE

CROSS-REFERENCE TO RELATED APPLICATIONS

This application claims priority to and the benefit of U.S. Provisional Patent Application No. 63/008,097, filed on Apr. 10, 2020, the disclosure of which is incorporated herein by reference in its entirety.

BACKGROUND

The present invention generally relates to base station support structures for cellular communications systems and, more particularly, to an improved monopole module for such systems.

Cellular communications systems are well known in the art. In a cellular communications system, a geographic area is divided into a series of regions that are referred to as "cells" and each cell is served by a base station. The base station may include one or more base station antennas that are configured to provide two-way radio frequency ("RE") communications with mobile subscribers that are geographically positioned within the cells served by the base station. In addition to the antennas, base stations typically comprise other related equipment including remote radio units (RRU's), over voltage protection packages (OVP's), and a variety of supporting components. Typically, the antennas and some of the related equipment are mounted on or in a support structure such as a tower or monopole. In one type of base station, sometimes referred to as an integrated monopole, the antennas, RRU's and related equipment may be mounted inside of the monopole.

An improved cellular communications monopole module for a base station is desired.

SUMMARY

In an aspect, the technology relates to a module for a base station monopole including: a wall defining an interior space, the wall including an opening configured to receive electronic equipment; and a reinforcement member secured to the wall, wherein the reinforcement member extends vertically.

In an example, a second opening is configured to receive electronic equipment. In another example, the opening and the second opening are vertically aligned. In still another example, the opening and the second opening occupy approximately the same circumferential extent of the wall. In yet another example, a top plate is at a first end of the module and a bottom plate is at a second end of the module defining a module for a monopole. In an example, the top plate and the bottom plate include apertures configured to receive bolts.

In another example, a first door closes the opening and a second door closes the second opening. In still another example, the wall includes at least one upper vent opening positioned on the wall opposite the opening. In yet another example, the wall includes at least one lower vent opening positioned on the wall opposite the second opening. In an example, the reinforcement member includes at least one of a tubular structure, a C-shaped channel, a square channel, a rectangular channel, an I-beam, an H-beam or combinations thereof In another example, the module has a longitudinal axis and the reinforcement member extends parallel to the longitudinal axis.

In still another example, the reinforcement member is positioned opposite to at least one of the opening and/or the second opening. In yet another example, the reinforcement member extends beyond the at least one upper vent opening and the at least one lower vent opening along the longitudinal axis. In an example, the at least one upper vent opening includes two upper vent openings and the at least one lower vent opening includes two lower vent openings, the reinforcement member being positioned between the two upper vent openings and between the two lower vent openings. In another example, the reinforcement member is attached to the wall by a weld, a braze, fasteners, rivets or combinations thereof. In still another example, the reinforcement member is not attached to the wall in areas that are laterally aligned with the at least one upper vent opening and the at least one lower vent opening.

In another aspect, the technology relates to a module for a base station monopole including: a wall defining an interior space, the wall including a vent opening in communication with the exterior of the module; and a baffle supported adjacent the wall, the baffle having an intake opening and an exhaust opening in communication with the vent opening, wherein the intake opening is laterally offset from the exhaust opening.

In an example, the wall includes a second vent opening, the vent opening and the second vent opening being at an elevation, the second vent opening not being connected to a baffle. In another example, the module has a diameter and the intake opening extends for a major part of the diameter of the module. In still another example, the intake opening faces downward. In yet another example, the baffle includes a first side wall and a second side wall that extends at an angle relative to the first side wall such that a width of the baffle increases from a first end to a second end. In an example, the exhaust opening is located at the second end.

In another example, a height of the baffle increases from the first end to the second end. In still another example, a center of the exhaust opening is offset from a center of the intake opening. In yet another example, an intake duct is in communication with the intake opening and an exhaust duct is in communication with the exhaust opening, and the intake duct is angularly offset from the exhaust duct. In an example, the intake opening and the exhaust opening do not substantially overlap in a lateral direction. In another example, the wall includes a third vent opening and a fourth vent opening, the third vent opening and the fourth vent opening being at a second elevation wherein the second elevation is different than the elevation.

In still another example, the third vent opening is connected to a second baffle and the fourth vent opening is not connected to a baffle. In yet another example, the baffle is disposed over electronic equipment that is housed in the module. In an example, the baffle is arranged such that, the intake opening is aligned generally along a diameter of the module. In another example, the baffle is arranged such that the exhaust opening is angularly and laterally offset from the diameter.

In another aspect, the technology relates to a module for a base station monopole including: a wall defining an interior space, the wall including an opening configured to receive electronic equipment and a vent opening in communication with the exterior of the module; a reinforcement member secured to the wall, wherein the reinforcement member is positioned opposite to the opening and adjacent the vent opening; and a baffle supported adjacent the wall, the baffle having an intake opening and an exhaust opening in communication with the vent opening, wherein the intake opening is laterally offset from the exhaust opening.

In another aspect, the technology relates to a module for a modular base station monopole including: a module defining an interior space, the module including an opening configured to receive electronic equipment and a vent opening in communication with the exterior of the module; and a baffle supported in the interior space, the baffle having an intake opening and an exhaust opening in communication with the vent opening, wherein the intake opening is laterally offset from the exhaust opening.

In an example, the module includes a wall and a reinforcement member is secured to the wall, the reinforcement member is positioned opposite to the opening and adjacent the vent opening. In another example, a top plate and a bottom plate are secured to the wall.

DETAILED DESCRIPTION

Pursuant to embodiments of the present invention, an integrated module for a monopole for cellular communications systems is provided. An integrated module refers to a monopole, section of a monopole or a module for a modular monopole that houses equipment for the base station such as remote radio units. The integrated module may have improved structural rigidity and better cooling capabilities than existing monopoles.

Figure 1:
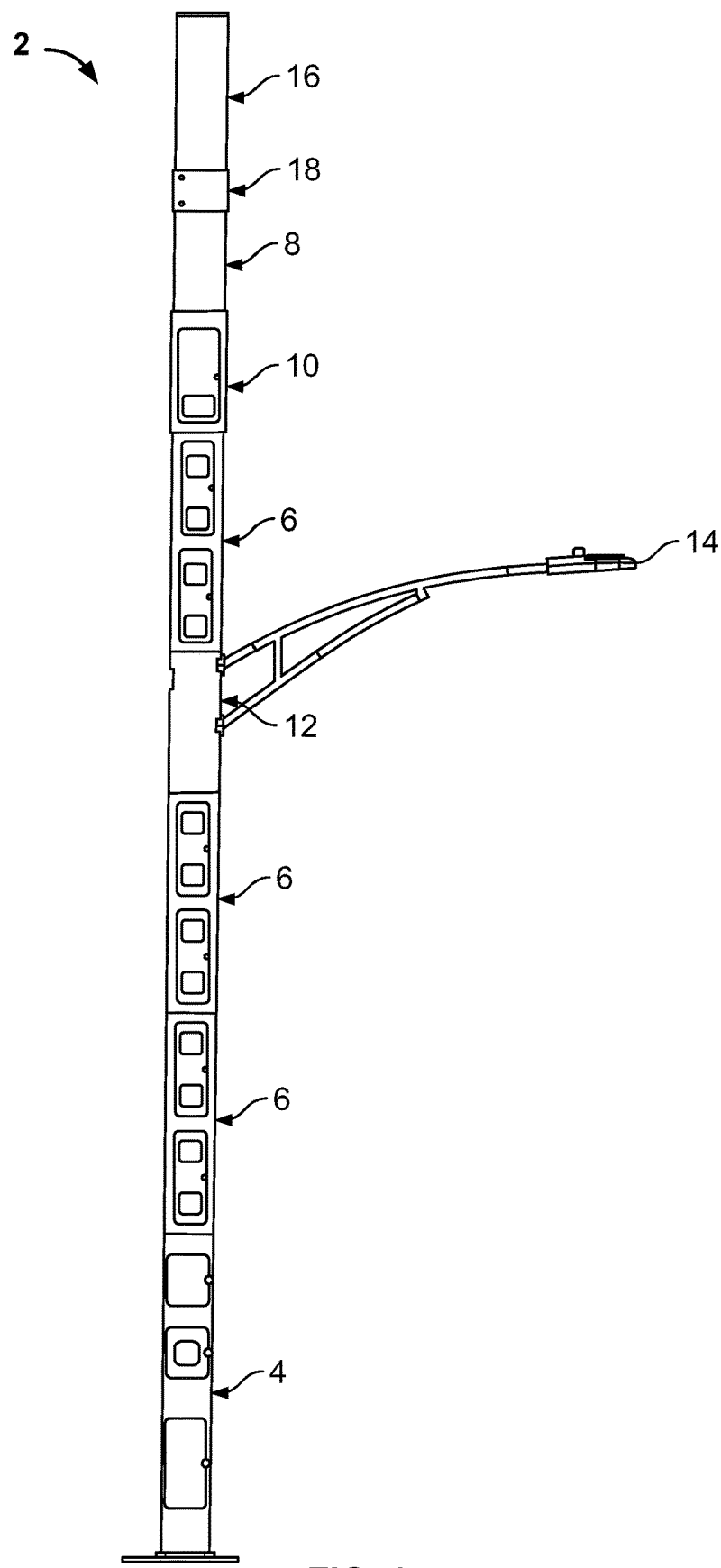
FIG. 1 is a side view of an exemplary modular monopole according to embodiments of the present invention.

Referring to FIG. 1, an embodiment of a modular monopole 2 is shown comprising a plurality of modules that are assembled in a vertical stack to form the monopole 2. The different modules shown in FIG. 1 may be structurally different from one another and may include different functionalities from one another. For example, the first module 4 may comprise a power base that forms the base of the monopole 2. A plurality of equipment enclosures 6 and a pole top equipment enclosure 10 may be provided that internally support equipment related to the base station such as remote radio units (RRU's), OVP's or the like. Expansion modules 8 may be provided that extend the height of the monopole 2 but that may not include any internal equipment. A luminaire mount 12 may be provided that supports a luminaire 14. An antenna mount 16 may be provided that supports the antennas internally or that includes a support structure 18 for mounting the antennas externally to the monopole 2. In a modular monopole a greater or fewer number of modules may be used and the modules may vary in function, size and number from those described with respect to FIG. 1. Examples of modular monopoles are disclosed in U.S. patent application Ser. No. 15/913,019 for a "Modular Monopole for Wireless Communications" filed on Mar. 6, 2018 to Hendrix et al. the entire content of which is incorporated by reference herein in its entirety, and U.S. patent application Ser. No. 16/655,986 for a "Perforated Door for Monopole Module and Method of Mounting Same" filed on Oct. 17, 2019 to Colapietro et al. the entire content of which is incorporated by reference herein in its entirety. While one embodiment of a modular monopole 2 is described that is made of a plurality of modules joined together in a stack to create the monopole 2, the integrated module as described herein may be used with any type of monopole and the integrated module may form an integral part of a unitary monopole rather than being assembled as a separate module in a modular monopole.

As previously explained, the module 100 may be formed as a module of a modular monopole as shown or it may be formed as an integral part of a unitary monopole. The module 100 may typically be round or polygonal in cross-section and is typically manufactured out of a material such as steel or aluminum, such as, for example, ½ to ³⁄₁₆ inch formed or rolled plate. The module 100 comprises a hollow generally cylindrical structure having a generally open interior space. Support structures may be supported by the wall of the module 100 and may support equipment such as remote radio units (RRU's) as will hereinafter be described.

Figure 2:
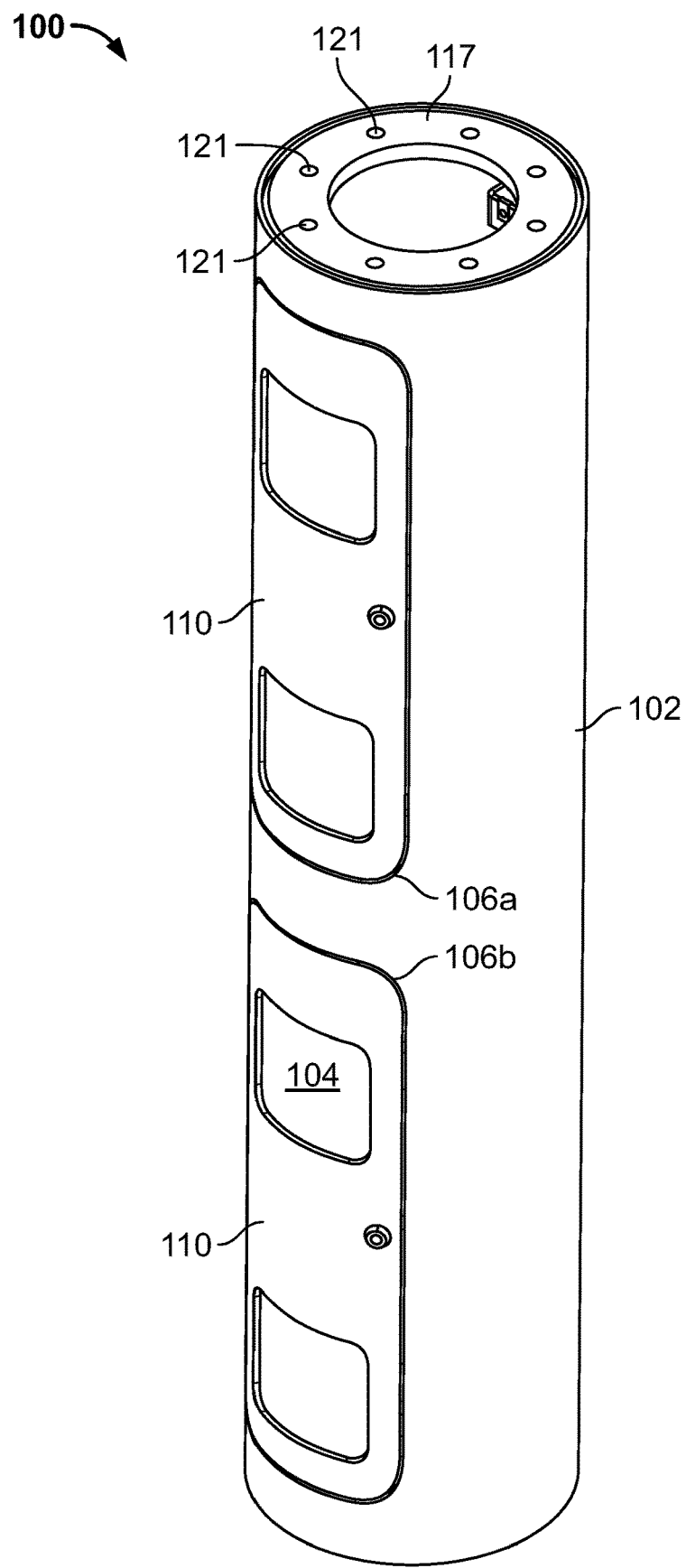
FIG. 2 is a perspective view of a module that may be used in the modular monopole of FIG. 1.
Figure 3:
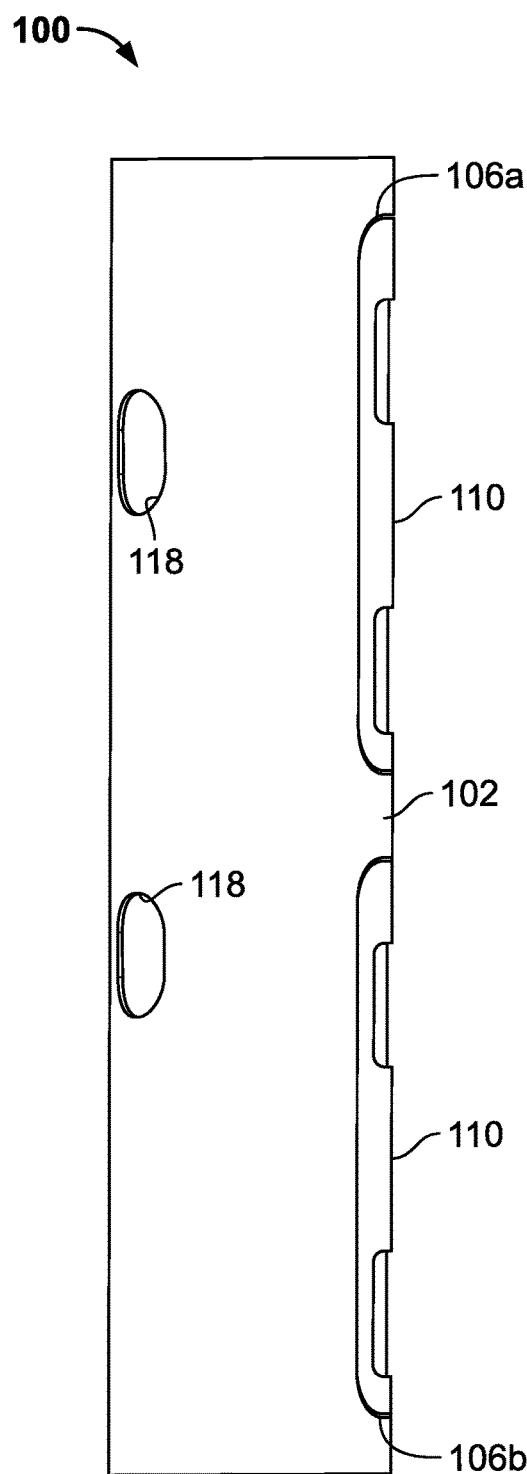
FIG. 3 is a side view of the module of FIG. 2.

RRU's may be supported in the interior space of the module 100. In a typical arrangement, a plurality of RRU's are mounted inside of the module 100. For example, a module 100 configured as shown in FIG. 2 may support four RRU's. The heat load from each RRU may range from approximately 100 W to 1.5 KW such that an installation with, for example, four RRU's may develop a significant heat load. As a result, providing thermal management for the cooling of the internal equipment, such as the RRU's, is important for an integrated module.

In order, to install, set up and maintain the internal equipment, it is necessary to provide access to the interior of the module 100. Openings may be formed in the module to allow access to the interior of the module. The openings may be closed by removable or movable doors. Forming openings in the module can weaken the module and create areas of localized stresses. As a result, providing a structurally rigid module 100 is also important.

Figure 4:
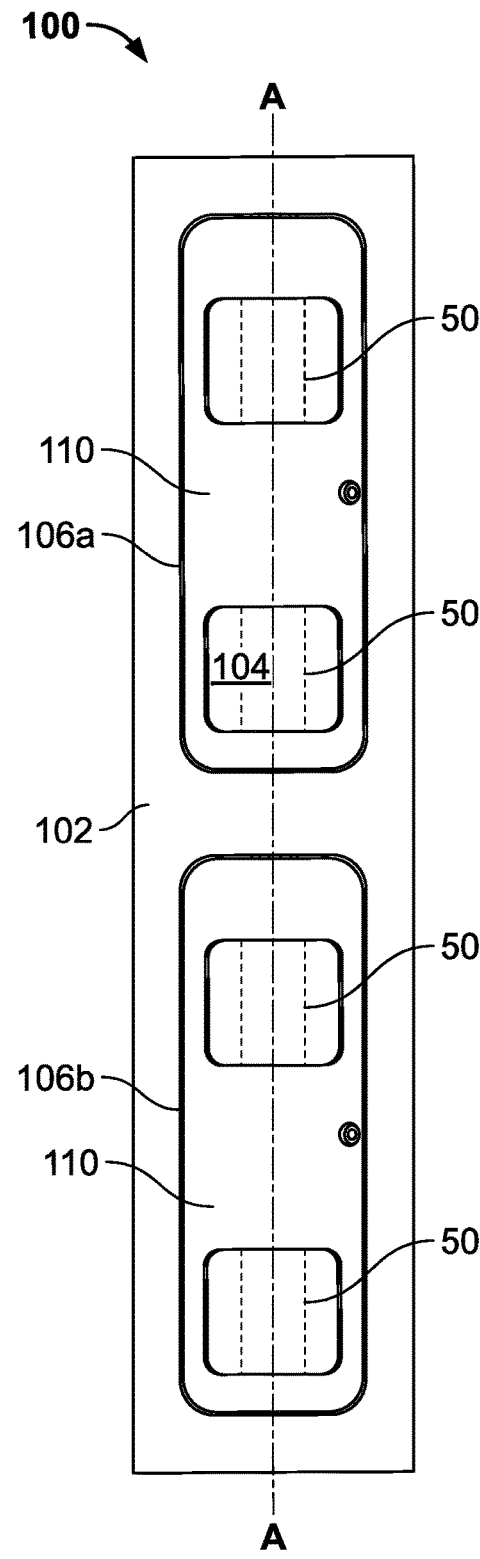
FIG. 4 is a front view of the module of FIG. 2.
Figure 7:
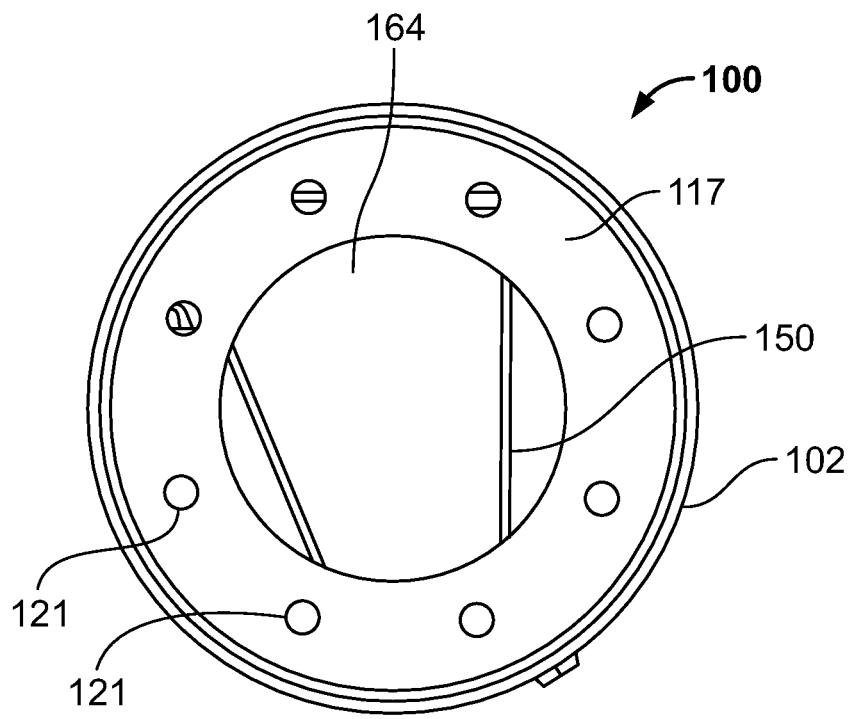
FIG. 7 is a top view of the module of FIG. 6.
Figure 8:
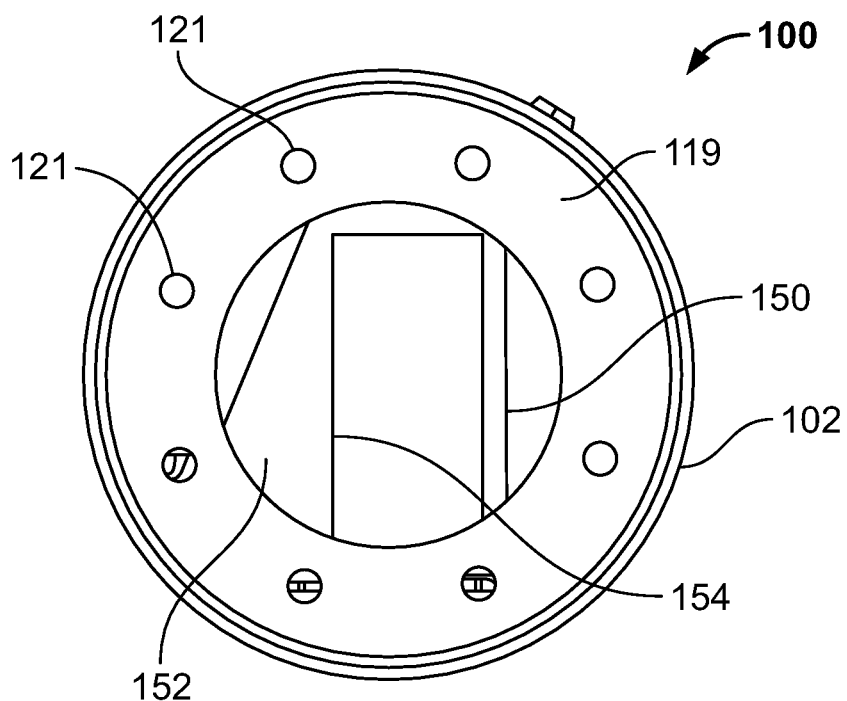
FIG. 8 is a bottom view of the module of FIG. 6.
Figure 9:
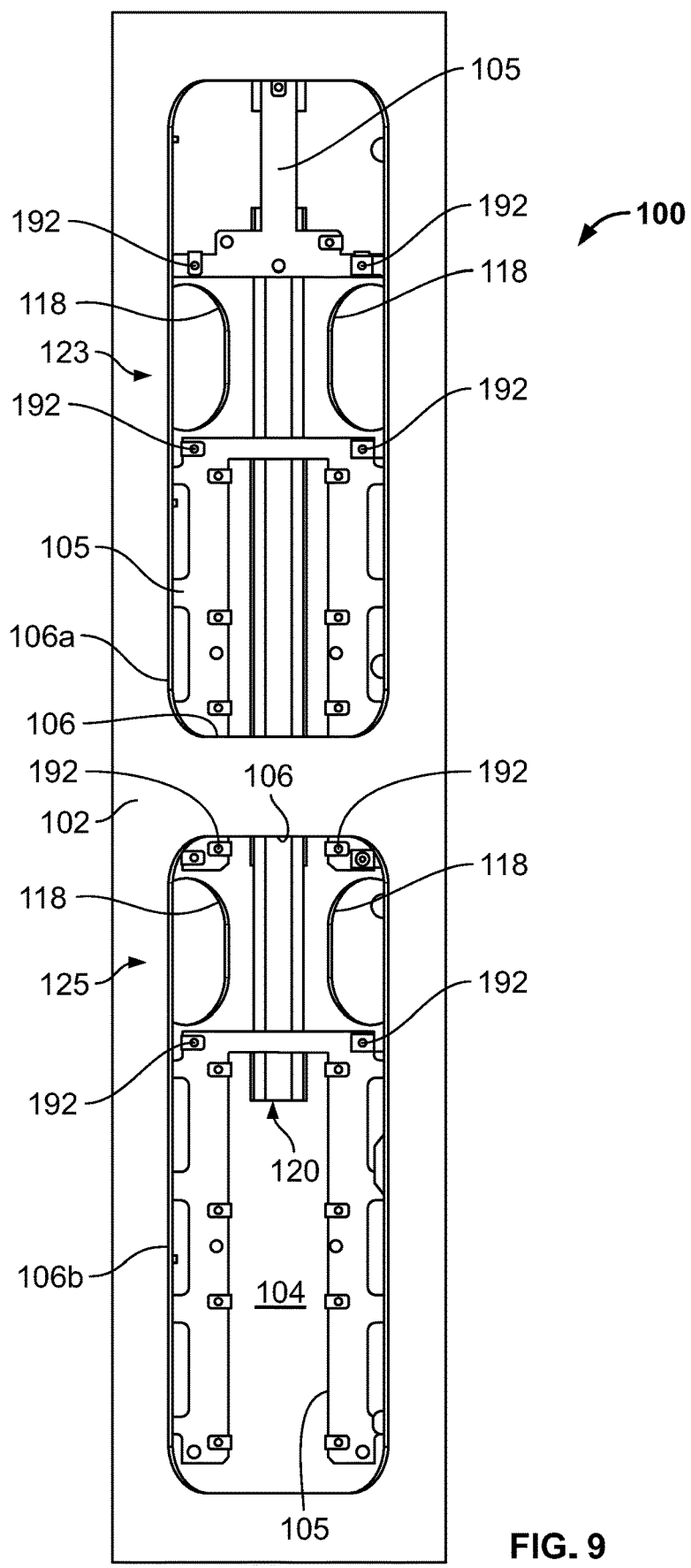
FIG. 9 is a front view of the module of FIG. 2 including the internal support structure.
Figure 10:
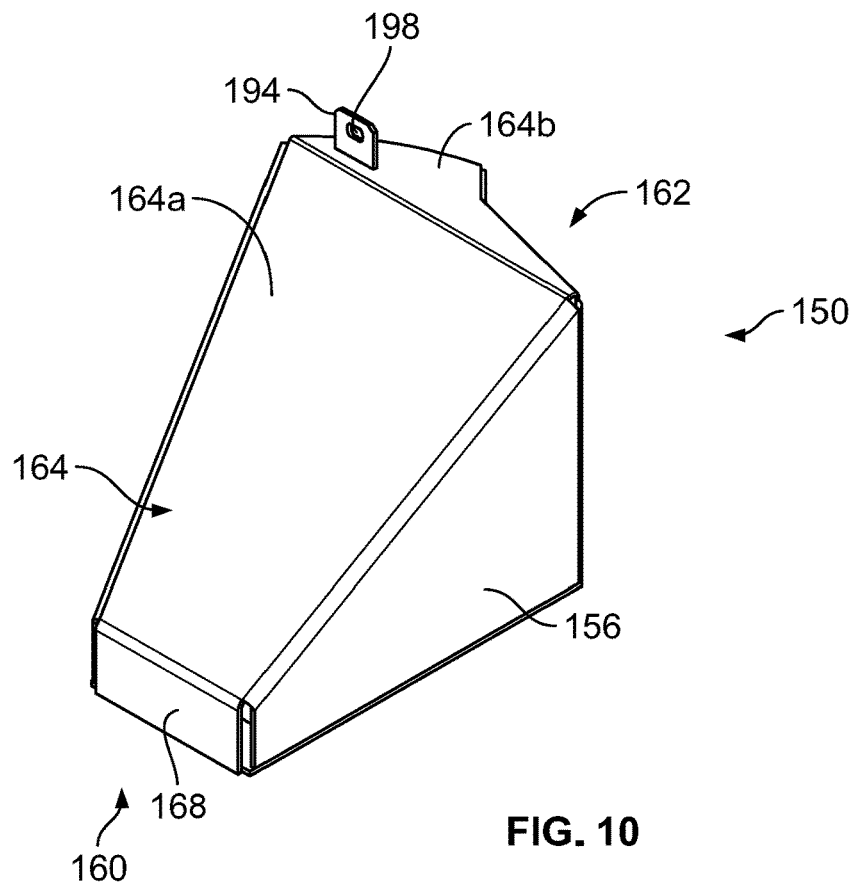
FIG. 10 is a top perspective view of the baffle used in the module of FIG. 2 according to embodiments of the present invention.
Figure 11:
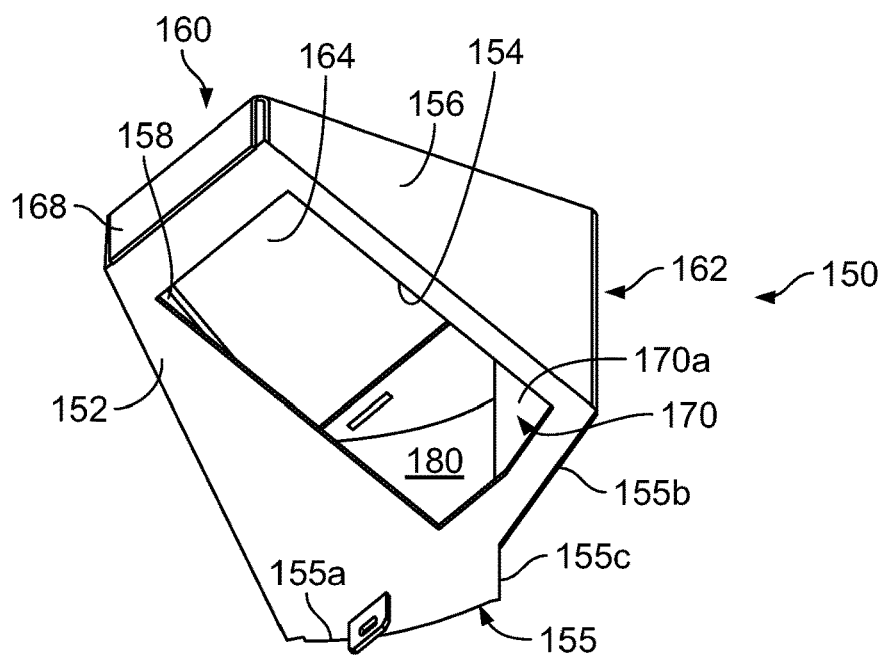
FIG. 11 is a bottom perspective view of the baffle of FIG. 10.
Figure 12:
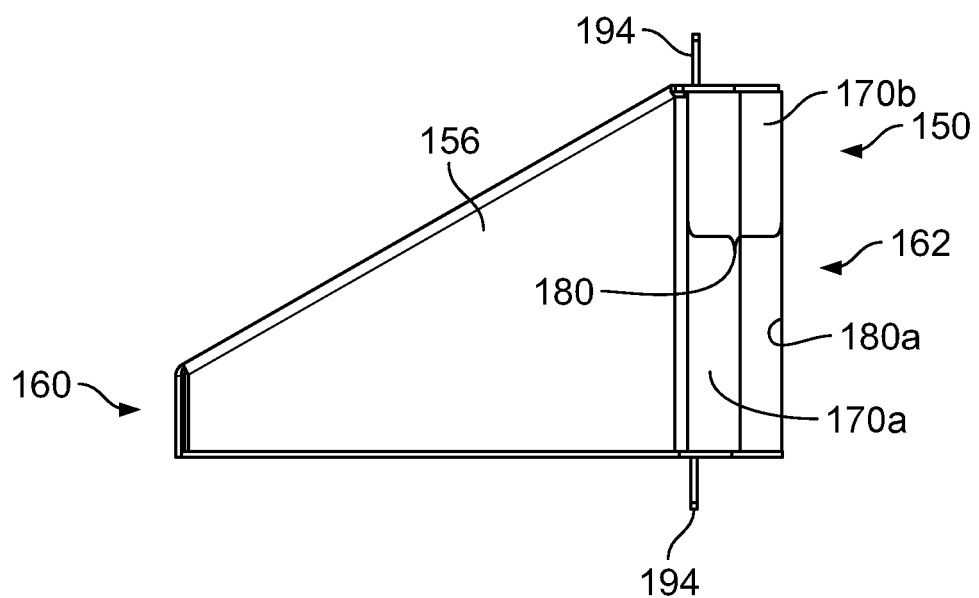
FIG. 12 is a side view of the baffle of FIG. 10.
Figure 16:
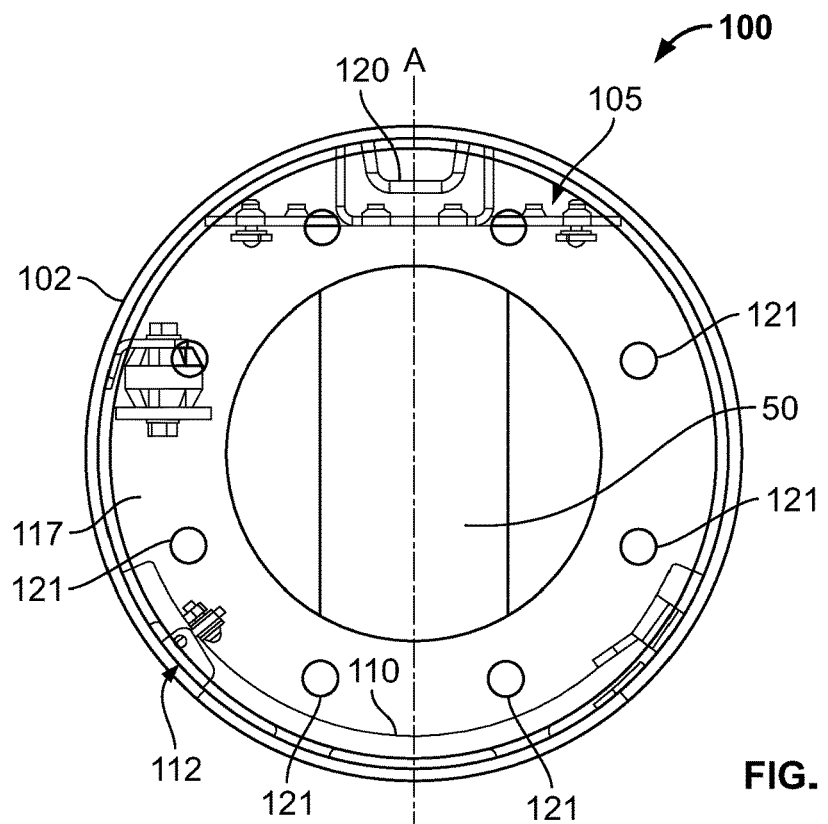
FIG. 16 is a top view of the module of FIG. 9 showing the arrangement of a remote radio unit.
Figure 17:
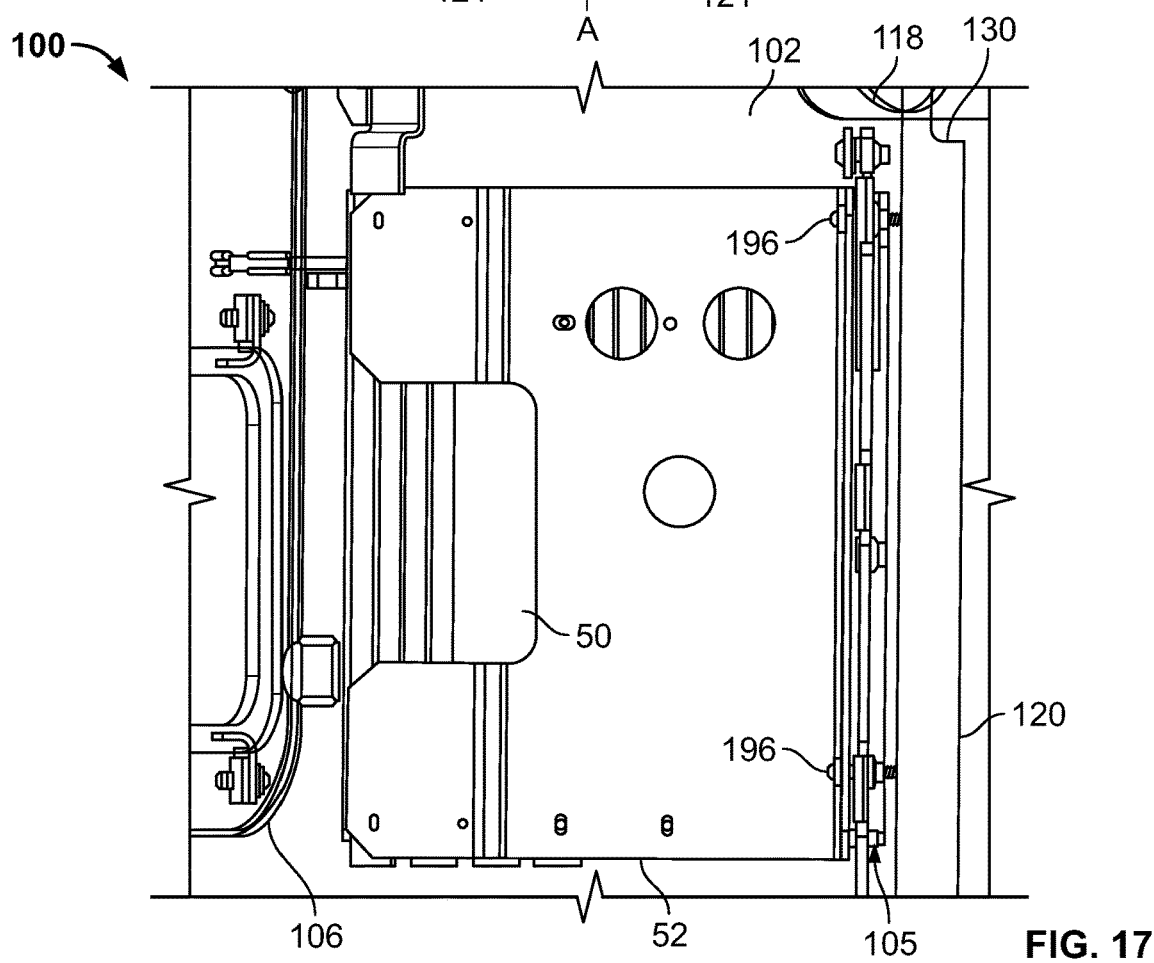
FIG. 17 is a partial section view of the module of FIG. 9 showing the arrangement of a remote radio unit.

One integrated module 100 is shown in FIGS. 2 through 9. The integrated module 100 comprises a cylindrical or polygonal wall 102 defining a generally cylindrical interior space 104. Supports 105 may be provided in the interior space 104 and be secured to an interior surface of wall 102 (FIGS. 9, 16 and 17). Brackets 52 that support the RRU's 50 may be secured to the supports 105 (FIGS. 16 and 17). Other equipment may be supported in the module 100 in a similar manner. Openings 106a, 106b are provided in the wall 102 to provide access to the interior space 104. In the illustrated embodiment, two openings 106a, 106b are provided in wall 102. The openings 106a, 106b are sized such that each opening may provide access to two RRU's. While two openings 106a, 1106b are shown, each providing access to two RRU's 50, as shown in FIG. 4, other arrangements may be provided where, for example, a different number of openings may be provided where each opening provides access to a different number of RRU's. In addition to the RRU's, the integrated module 100 may support equipment other than RRU's such as power equipment, fiber units, or the like. The openings 106a, 106b are vertically aligned to provide an upper opening 106a and a lower opening 106b where each opening 106a, 106b occupies approximately the same circumferential extent of the module 100. An example of a modular monopole is disclosed in U.S. Patent Application No. 62/853,989 for a "Monopole Door Hinge and Assemblies" filed on May 29, 2019 to Williams et al. the entire contents of which is incorporated by reference herein in its entirety.

Figure 6:
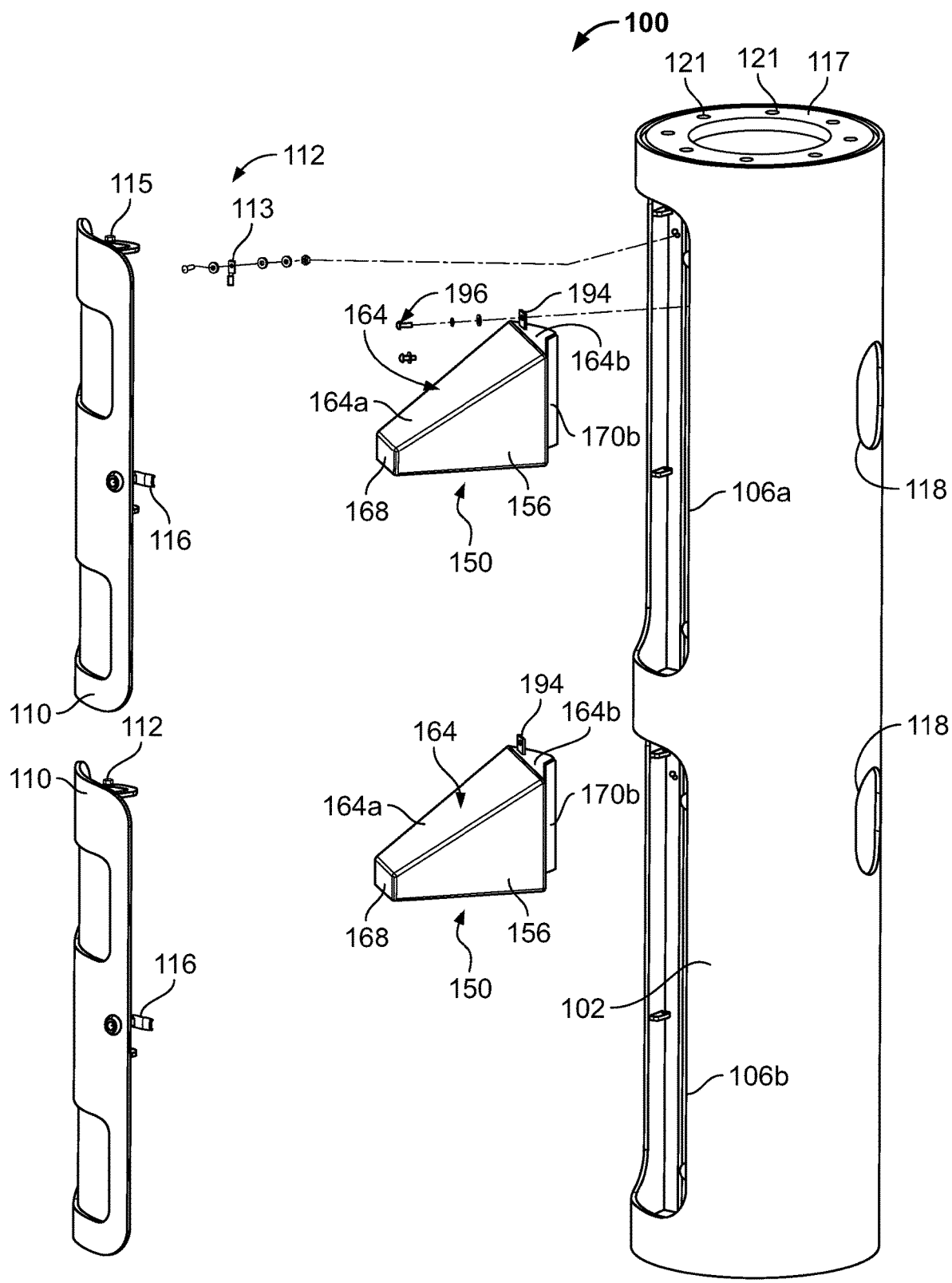
FIG. 6 is an exploded view of the module of FIG. 2 including baffles according to embodiments of the present invention.

Each opening 106a, 106b may be closed by a door 110 to isolate the interior space 104 from the external environment. Referring to FIG. 6, hinges 112 may be used to pivotably attach the doors 110 to the wall 102 to allow the doors 110 to swing between open and closed positions. The hinges 112 may comprise a pin or pintle 113 supported on the wall 102 that engages a knuckle or aperture 115 on the door 110. The doors 110 may include locks 116 to secure the doors 110 in the closed position. In other embodiments, the doors 110 may be completely releasable from the integrated module and may be secured in place by clips, fasteners or the like.

As shown in FIGS. 4 and 16, the openings 106a, 106b are symmetrically positioned relative to a central plane A-A of the module 100. The central plane A-A extends approximately through a diameter of the module 100. The portion of the module 100 having openings 106 and doors 110 may be considered the front of the module 100 with the opposite side of the module 100 being the back of the module 100. The plane A-A extends from the front of the module 100 to the back of the module and divides the module into left and tight portions. The equipment such as RRUs 50 are inserted into the interior space 104 through openings 106. The RRU's are typically generally symmetrically positioned along the plane A-A, in part, because the plane A-A is on the diameter of the module and provides greatest depth in space 104. As shown, the RRU's 50 may be stored vertically, may extend along plane A-A and are generally symmetrically dispose with respect to plane A-A.

In a modular monopole, the module 100 may form a complete module and the upper end may be closed by a top plate 117 and the bottom end may be closed by a bottom plate 119 as shown, for example, in FIGS. 7 and 8. The top plate 117 and the bottom plate 119 may include apertures 121 for receiving bolts to fix the module 100 to modules located above and/or below the module 100, respectively.

Figure 5:
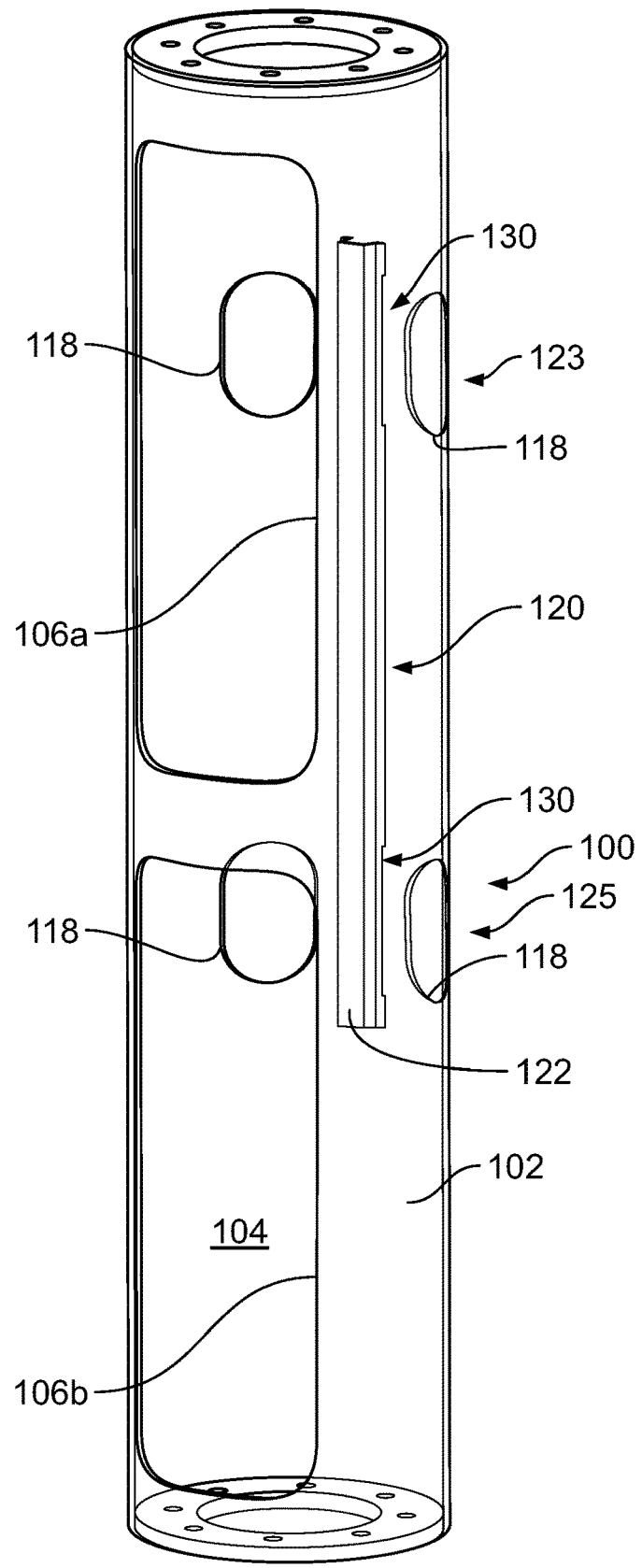
FIG. 5 is a perspective view of the module of FIG. 2.

Vent openings 118 may also be provided in the wall 102 to vent the module 100 and to allow air flow over the stored equipment, such as RRU's, for thermal management. Vent openings 118 are formed generally on the opposite side of wall 102 from openings 106. Viewing the module from the top, if the centers of openings 106 are on the central plane A-A, the vent openings 118 are offset from the central plane A-A to either side thereof. The vent openings 118 are arranged in pairs where the vent openings 118 of each pair are at substantially the same elevation. Referring to FIG. 5, the first or upper pair 123 of vent openings 118 is vertically disposed adjacent the top of upper opening 106a and the second or lower pair 125 of vent openings 118 is vertically disposed adjacent the top of lower opening 106b. In this manner, the RRU's 50 contained in openings 106a and 106b are associated with one pair of vent openings 118. Vent openings 118 will be discussed in greater detail below. While two vent openings are shown in the drawings, a greater number of vent openings may be used depending on system conditions.

Because openings 106a, 106b and vent openings 118 are formed in the wall 102 of the module 100, the structural rigidity of the wall 102 may be reduced in the areas adjacent these openings. In use, shear and moment loads are applied to the top end of the module 100 by wind forces and/or by loads supported by the module 100. There are also downward loads on the module 100 by the weight of the supported equipment and the weight of the modules and equipment above the module 100.

To prevent failure of the module 100 from the applied loads, a reinforcement member 120 is secured to the interior surface of wall 102 as shown in FIGS. 5, 9 and 17. The reinforcement member 120 may be made of any suitable strong material such as steel. The reinforcement member 120 may have any shape that provides a rigid reinforcement to the wall 102. For example, reinforcement member 120 may comprise a tubular structure, a C-shaped channel, a square or rectangular channel, I-beam, H-beam or the like. The reinforcement member 120 may include a reinforcement structure such as ribs 122 as shown in FIG. 5. In one embodiment, the reinforcement member 120 is disposed midway between the vent openings 118 and extends vertically parallel to the longitudinal axis of the module 100, as represented by line A-A in FIG. 4, and may be centered on plane A-A. With the vent openings 118 disposed symmetrically relative to the openings 106, the reinforcement member 120 is located substantially directly opposite to the center of the openings 106 on plane A-A. In one embodiment, the reinforcement member 120 extends beyond the upper end of the upper pair 123 of vent openings 118 and beyond the lower end of the lower pair 125 of vent openings 118.

The reinforcement member 120 may be attached to the interior surface of wall 102 by any suitable attachment mechanism such as welding, brazing, fasteners such as bolts or rivets or combinations of such attachment mechanisms. In one embodiment, the surface, or surfaces, of the reinforcement member 120 that is attached to wall 102 includes gaps 130 where the reinforcement member is not in contact with the wall 102. The gaps 130 are laterally aligned with the vent openings 118 and extend for the height of the vent openings 118. The reinforcement member 120 provides a structurally rigid module 100.

The vent openings 118 are provided to allow air flow through the module 100 and to vent hot air created by the RRU's 50 from the interior space 104. To facilitate the venting of air from the interior space 104 a baffle 150 is provided that communicates with one vent opening 118 of each pair 123, 125 of vent openings 118. Referring to FIGS. 6-8 and 10-15, the baffle 150 comprises a bottom wall 152 having an opening 154 that defines the air intake of the baffle 150. The intake opening 154 comprises a substantially elongated opening having its longitudinal axis B-B (FIG. 13) extending parallel to plane A-A. Axis B-B may also be aligned with or closely adjacent to plane A-A such that the intake opening 154 is disposed over the RRU's 50. While the intake opening 154, as illustrated, has a rectangular shape, the intake opening may have other shapes. When the baffle 150 is installed in the module 100 the opening 154 extends for major part of the diameter of the module 100 and axis B-B extends substantially parallel to the central plane A-A of the module 100 and is generally aligned with the center of the openings 106. The opening 154 is positioned substantially at the center of the openings 106 such that it is disposed over the equipment, such as RRU's 50, contained in the module 100. The bottom wall 152 extends substantially horizontally when the baffle 150 is installed in the module 100. The opening 154 faces downward such that rising hot air will enter the baffle 150 through the intake opening 154.

The bottom wall 152 has an edge 155 that includes a first segment 155a that extends from side edge 157 and is configured to match the internal shape and size of wall 102 such that when the baffle 150 is installed inside of the module 100 the first segment 155a abuts or is closely adjacent to the internal surface of wall 102. The edge 155 includes a second segment 155b that extends at an obtuse angle from side edge 159 and is linear. The edge 155 includes a linear third segment 155c that connects the first segment 155a and the second segment 155b.

Figure 14:
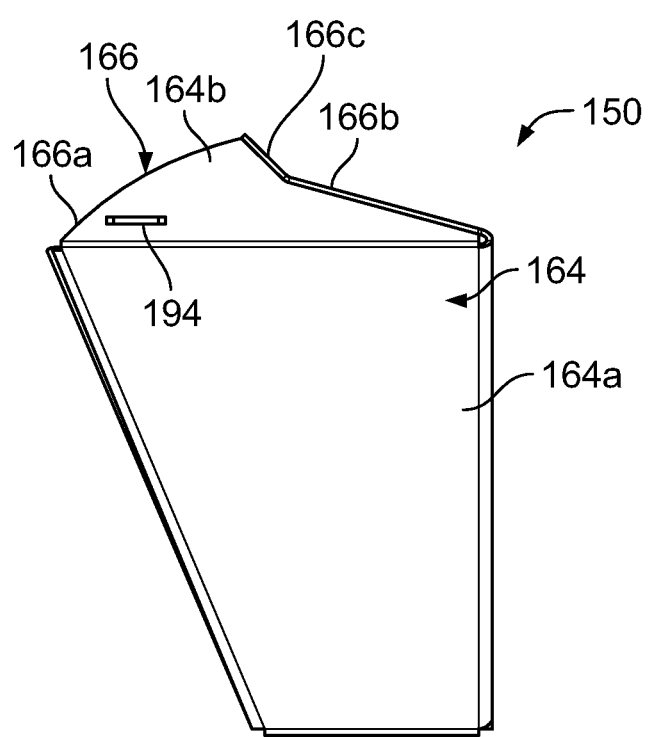
FIG. 14 is a top view of the baffle of FIG. 10.
Figure 15:
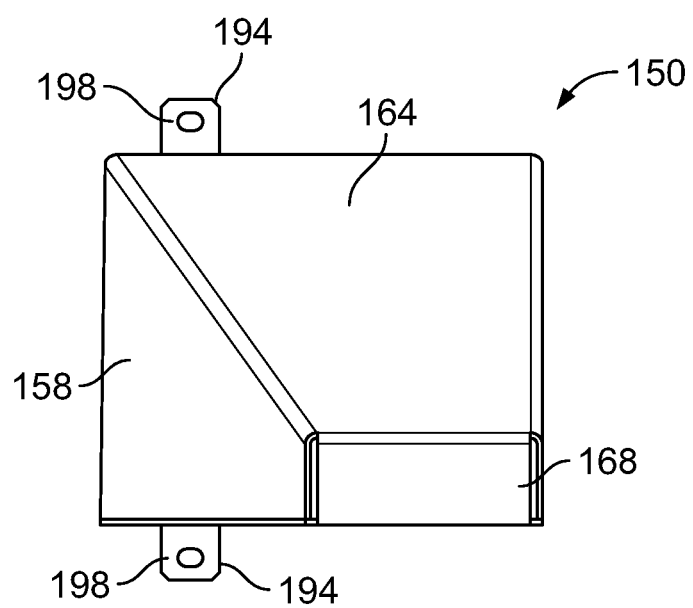
FIG. 15 is an end view of the baffle of FIG. 10.

The baffle 150 comprises a first side wall 156. The first side wall 156 connects to edge 159 of bottom wall 152 and extends substantially perpendicularly from the bottom wall 152 such that when the baffle 150 is installed in the module 100 the first side wall 156 extends substantially vertically. The side wall 156 also extends substantially parallel to axis B-B. The baffle 150 comprises a second side wall 158. The second side wall 158 connects to edge 157 of bottom wall 152 and extends substantially perpendicularly from the bottom wall 152 such that when the baffle 150 is installed in the module 100 the second side wall 158 extends substantially vertically. Side wall 158 extends at an angle relative to the axis B-B such that the baffle 150 widens in the lateral direction from the first end 160 of the baffle 150 to the second end 162 of the baffle 150. The side walls 156 and 158 also increase in height from the first end 160 to the second end 162 such that the height of the baffle increases from the first end 160 to the second end 162. A top wall 164 comprising a first top wall portion 164a and a second top wall portion 164b closes the top of the baffle 150. The first top wall portion 164a extends between the side walls 156 and 158 and both widens and extends upwardly from the first end 160 to the second end 162. The second top wall portion 164b extends from the first top wall portion 164a and extends substantially parallel to bottom wall 152 such that it extends substantially horizontally when the baffle 150 is installed in the module 100. As best shown in FIG. 14, the second top wall portion 164b has an edge 166 that includes a first segment 166a that extends from side wall 158 and that is configured to match the internal shape and size of wall 102 such that when the baffle 150 is installed inside of the module 100 the first segment 166a abuts or is closely adjacent to the internal surface of wall 102. The edge 166 includes a second segment 166b that extends from side wall 156 at an obtuse angle and is linear. The edge 166 includes a linear third segment 166c that connects the first segment 166a and the second segment 166b. The edge 155 of the bottom wall 152 and the edge 166 of the top wall 164 are configured the same and the edge 155 is disposed directly below the edge 166.

A first end wall 168 extends between the bottom wall 152 and top wall 164 and between the side walls 156 and 158 to close the first end 160 of the baffle 150. As a result, air entering the baffle 150 through intake opening 154 is directed toward the second end 162.

Figure 13:
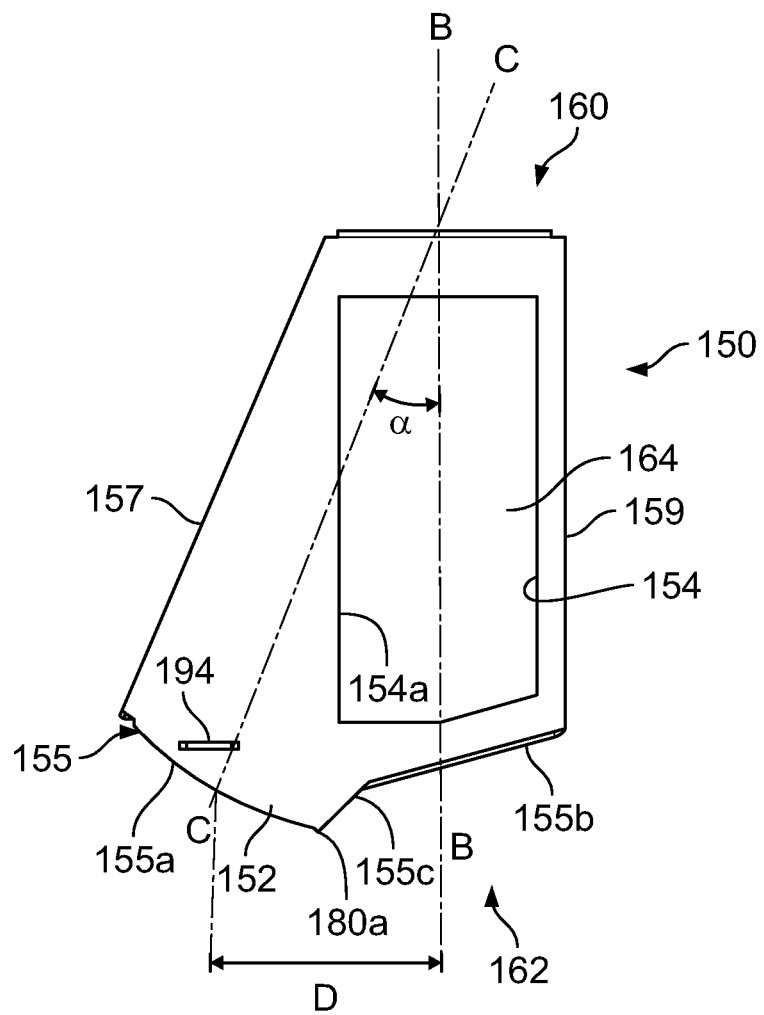
FIG. 13 is a bottom view of the baffle of FIG. 10.

The second end of the baffle 150 is partially closed by a second end wall 170. The second end wall 170 includes a first planar wall portion 170a that extends between the edge segments 155b and 166b and a second planar wall portion 170b that extends between the edge segments 155c and 166c (FIG. 6). The second end 162 of the baffle 150 between the edge segments 155a and 166a is not closed by a wall. As a result, an opening 180 that defines the air exhaust is created that extends between the top wall 164 and bottom wall 152 in the vertical direction and between the side wall 158 and the wall portion 170b in the horizontal direction. The center of exhaust opening 180, as defined by axis C-C, is offset from the center of the intake opening 154, as defined by axis B-B, by a distance D as shown in FIG. 13. Moreover, the intake duct as defined by intake opening 154 and side wall 156 is offset from the exhaust duct as defined by side wall 158 and exhaust opening 180 by angle α. In one embodiment, internal longitudinal edge 154a of the intake opening 154 is substantially aligned with the internal edge 180a of the exhaust opening 180. In some embodiments, the intake opening 154 and the exhaust opening 180 do not overlap or do not substantially overlap in the horizontal direction. While in one preferred embodiment the intake opening is laterally offset from the exhaust opening, in some embodiments the intake opening may be more generally vertically aligned with the exhaust opening.

The baffles 150 are mounted in the module 100 as follows. Referring to FIGS. 6, 9, 16 and 17, the module 100 includes mounting supports 105 mounted to the inside surface of wall 102. The mounting supports 105 may be mounted by any suitable attachment mechanism such as rivets, bolts, welding or the like. The mounting supports 105 include threaded bores 192 that receive threaded fasteners 196 such as bolts, screws or the like. The baffle 150 includes flanges 194 extending from the bottom wall 152 and the top wall 164 each including an aperture 198. The baffles 150 are positioned in the module 100 such that the apertures 198 align with selected ones of the threaded bores 192. A threaded fastener 1% is inserted through the apertures 198 and is screwed into the threaded bores 192 to secure the baffles 150 in position. Other connection mechanisms may be used to connect the baffles 150 to the module 100 such as rivets, welds, mating snap fit connectors, deformable connectors or the like.

One baffle 150 is secured to one vent opening 118 of the upper pair 123 of vent openings 118 and one baffle 150 is secured to one vent opening 118 of the lower pair 125 of vent openings 118. The other vent opening 118 of the pairs of vent openings 123, 125 is left open to the external environment without being connected to a baffle 150. When the baffles 150 are attached to the module 100 the intake opening 154 of each baffle 150 extends for a major portion of the inside diameter of the module 100, as shown in FIG. 8, and is positioned in the approximate center of the module 100 over the equipment contained in the module 100. For example, the baffle 150 may extend for approximately 75% of the inside diameter of the module 100. This allows air to circulate round the sides and the first end 160 of the baffle 150 while allowing hot air rising from the equipment, such as RRU's 50, to enter the intake opening 154. The opening 180 is aligned with one vent opening 118 of each of the pairs of openings 123, 125 such that air that flows into the baffles 150 via intake openings 154 flows out of exhaust openings 180, through the vent openings 118 and is exhausted from the module 100. Each baffle 150 is disposed over the electronic equipment that is housed in the module 100 below that baffle. In the illustrated embodiment, the module is configured such that the interior space adjacent each of openings 106 houses two RRU's 50. A baffle 150 is disposed above each pair of RRU's 50 such that in the illustrated embodiment two baffles 150 are used with one baffle 150 being disposed over the two lower RRU's 50 and one baffle 150 being disposed over the two upper RRU's 50. While in the illustrated embodiment, two RRU's 50 are associated with each pair of vent openings 118 and each baffle 150, this ratio may be different based on the geometry of the module and equipment, the heat generated by the electronic equipment, the ambient conditions, the operating temperature ratings of the equipment or the like. Moreover, while venting system has been described with reference to RRU's 50, the venting system may be used to cool any electronic equipment contained in module 100.

Each baffle 150 is arranged such that the intake opening 154 is aligned generally along the diameter of the module 100 approximately centered on central plane A-A. The exhaust opening 180 is angularly and laterally offset from the intake opening 154 such that the exhaust opening 180 is angularly and laterally offset from the central plane A-A of the module 100. Thus, the intake opening 154 is circumferentially spaced from the exhaust opening 180 about the perimeter of the module and the intake opening 154 is not vertically aligned with the exhaust opening 180. It has been found that providing two vent openings 118 at the same elevation but angularly offset from one another where one vent opening 118 is connected to a baffle 150 and one vent opening 118 is left open where the baffle 150 has an intake opening 154 that is angularly and laterally offset from the exhaust opening 180 provides superior cooling of the interior of the module 100.

The present inventive concepts have been described above with reference to the accompanying drawings. The present inventive concepts are not limited to the illustrated embodiments. Rather, these embodiments are intended to fully and completely disclose the present inventive concepts to those skilled in this art. In the drawings, like numbers refer to like elements throughout. Thicknesses and dimensions of some components may be exaggerated for clarity.

Spatially relative terms, such as "under," "below," "lower," "over," "upper," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

Herein, the terms "attached," "connected," "interconnected," "contacting," "mounted," and the like can mean either direct or indirect attachment or contact between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the present inventive concepts. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, operations, elements, and/or components, but do not preclude the presence or addition of one or more other features, operations, elements, components, and/or groups thereof.

What is claimed:

1. A module for a base station monopole comprising:
   a wall defining an interior space, the wall comprising an opening configured to receive electronic equipment and at least one vent opening positioned on the wall opposite the opening, the at least one vent opening in communication with the exterior of the module;
   a reinforcement member secured to the wall, wherein the reinforcement member extends vertically, wherein the module has a longitudinal axis and the reinforcement member extends parallel to the longitudinal axis, wherein the reinforcement member extends beyond the at least one vent opening along the longitudinal axis, and wherein the reinforcement member includes a gap such that the reinforcement member is spaced apart from and not in contact with the wall, the gap laterally aligned with the at least one vent opening and extending for a height of the at least one vent opening with respect, to the longitudinal axis; and
   a baffle supported adjacent the wall, the baffle having an intake opening and an exhaust opening in communication with the at least one vent opening, wherein the intake opening is laterally offset from the exhaust opening.

2. The module according to claim 1, wherein the reinforcement member comprises at least one of a tubular structure, a C-shaped channel, a square channel, a rectangular channel, an I-beam, an H-beam or combinations thereof.

3. The module according to claim 1, further comprising a second lower opening configured to receive electronic equipment, the wall comprising at least one second lower vent opening positioned on the wall opposite the second lower opening, wherein the reinforcement member extends beyond the at least one vent opening and the at least one second lower vent opening along the longitudinal axis.

4. The module according to claim 3, wherein the at least one vent opening comprises two upper vent openings and the at least one second lower vent opening comprises two lower vent openings, the reinforcement member being positioned between the two upper vent openings and between the two lower vent openings.

5. The module according to claim 1, wherein the reinforcement member is positioned opposite to the opening.

6. The module according to claim 1, wherein the reinforcement member is attached to the wall by a weld, a braze, fasteners, rivets or combinations thereof.

7. A module for a base station monopole comprising:
   a wall defining an interior space, the wall comprising a vent opening in communication with the exterior of the module; and
   a baffle supported adjacent the wall, the baffle having an intake opening and an exhaust opening in communication with the vent opening, wherein the intake opening is laterally offset from the exhaust opening.

8. The module according to claim 7, wherein the module has a diameter and the intake opening extends for a major part of the diameter of the module.

9. The module according to claim 8, wherein the baffle is arranged such that the exhaust opening is angularly and laterally offset from the diameter.

10. The module according to claim 7, wherein the baffle comprises a first side wall and a second side wall that extends at an angle relative to the first side wall such that a width of the baffle increases from a first end to a second end.

11. The module according to claim 10, wherein the exhaust opening is located at the second end.

12. The module according to claim 7, wherein a center of the exhaust opening is offset from a center of the intake opening.

13. The module according to claim 7, wherein an intake duct is in communication with the intake opening and an exhaust duct is in communication with the exhaust opening, and wherein the intake duct is angularly offset from the exhaust duct.

14. The module according to claim 7, wherein the intake opening and the exhaust opening do not substantially overlap in a lateral direction.

15. The module according to claim 7, wherein the wall comprises a second vent opening, the vent opening and the second vent opening being at an elevation, the second vent opening not being connected to a baffle.

16. The module according to claim 15, wherein the wall comprises a third vent opening and a fourth vent opening, the third vent opening and the fourth vent opening being at a second elevation wherein the second elevation is different than the elevation.

17. The module according to claim 16, wherein the third vent opening is connected to a second baffle and the fourth vent opening is not connected to a baffle.

18. A module for a base station monopole comprising:
  a wall defining an interior space, the wall comprising an opening configured to receive electronic equipment and a vent opening in communication with the exterior of the module;
  a reinforcement member secured to the wall, wherein the reinforcement member is positioned opposite to the opening and adjacent the vent opening; and
  a baffle supported adjacent the wall, the baffle having an intake opening and an exhaust opening in communication with the vent opening, wherein the intake opening is laterally offset from the exhaust opening.

* * * * *